UNITED STATES PATENT OFFICE.

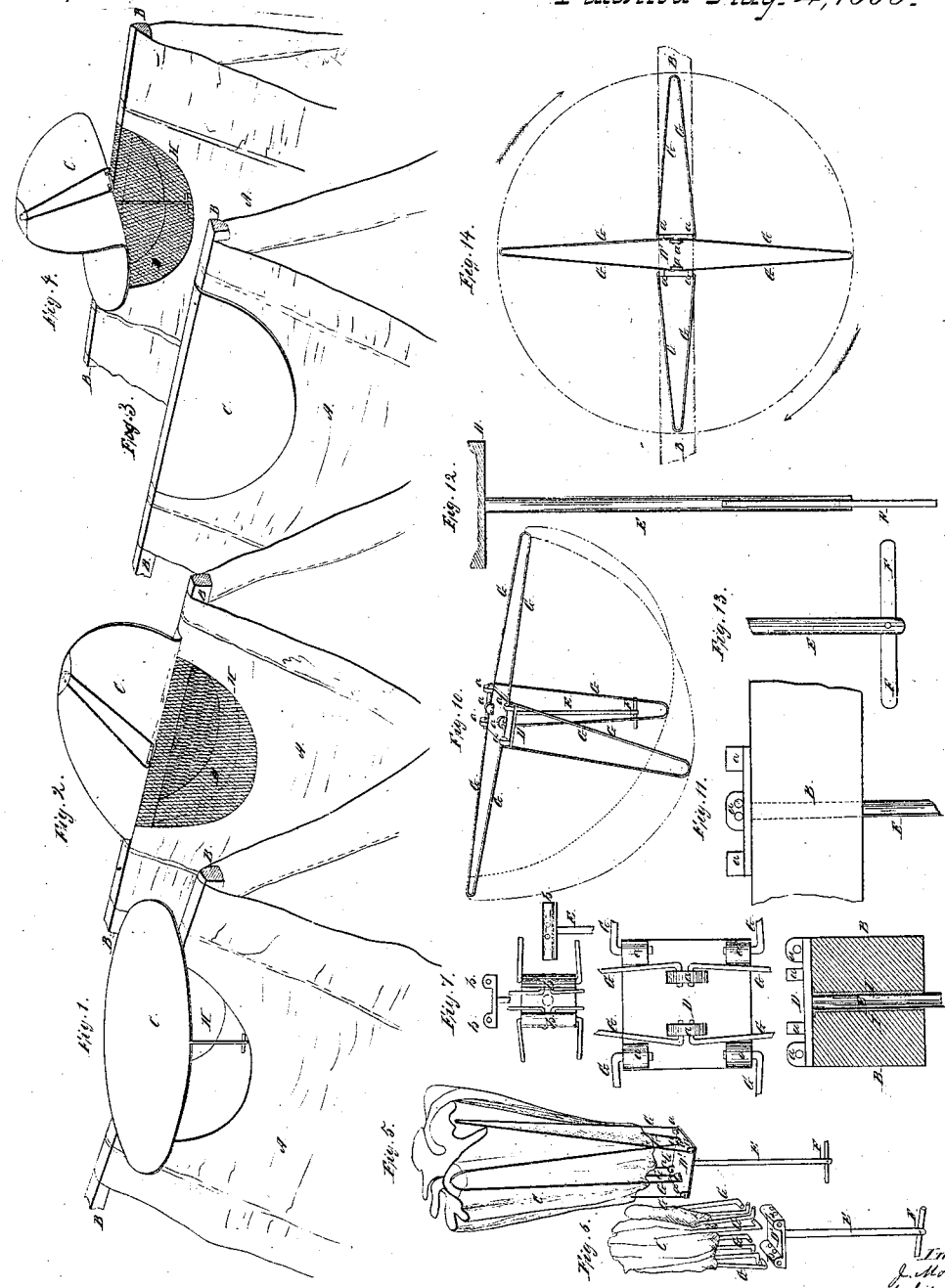

JOHN MOAKLEY, OF NEW YORK, N. Y.

IMPROVEMENT IN VENTILATING-CAPS FOR TENTS.

Specification forming part of Letters Patent No. 39,416, dated August 4, 1863.

*To all whom it may concern:*

Be it known that I, JOHN MOAKLEY, of the city, county, and State of New York, have invented an Improved Method of Ventilating Tents; and I do hereby declare the following to be a full and correct description of the same, reference being had to the accompanying drawings, in which—

Figure 1 is a perspective view of the upper part of a tent with the ventilating-aperture open on both sides, but protected above. Fig. 2 is a similar view showing the ventilating-aperture open on one side of the tent. Fig. 3 is a similar view, showing the ventilating-aperture entirely closed. Fig. 4 is a similar view showing the ventilating aperature open on both sides and the cover thrown up toward one end of the tent. Fig. 5 is a perspective view showing the circular cover gathered up and the mode of its attachment to its arms and central plate. Fig. 6 is a perspective view showing a different mode of attaching the arms to the plate. Fig. 7 is a top, end, and side view of the mode of attachment represented in Fig. 6. Fig. 8 is a top view (enlarged) of the central plate. Fig. 9 is a section of central plate, its axis, socket, and ridge-pole. Fig. 10 is a perspective view of central plate, its axis, and arms, their position being that which they occupy when the ventilating-aperture is entirely closed, as in Fig. 3, the dotted lines indicating the position of the circular cover or cap. Fig. 11 is a side elevation of ridge-pole, central plate, and axis. Fig. 12 is a side elevation of the axis. Fig. 13 is a similar view at right angles to that shown in Fig. 12. Fig. 14 is a top view of the arms in the position they occupy when the ventilating-aperture is open at the sides and protected at top, as shown in Fig. 1.

The same part is marked by the same letter wherever it occurs.

The nature of my invention consists in a simple method of ventilating the ordinary tents now in use by making a circular aperture of the requisite size in the top of the tent and providing it with an adjustable revolving cover supported on arms hinged to a central plate, said plate having an axis which passes down through the ridge-pole or other supporting member, and is capable of being rotated by means of a cross-piece at its lower end, all as hereinafter more particularly described.

To enable others to make and use my improved ventilating apparatus, I will proceed to describe its construction and operation, referring to the drawings, in which—

A marks the side of the tent; B, the ridge-pole; C, the circular cover; D, the central supporting-plate; D', a modified form of the same; E, the axis of plate D; F, the cross-piece or handle of the axis E; G, the supporting rods or arms to which the cover is attached; H, the ventilating-aperture in the top of the tent; I the socket in which the axis E turns. *a* marks the eyes on plate D, which receive the bent ends of rods G; *b*, the ridges on plate D', Fig. 6.

The tents A here represented are of the common form, having a ridge-pole, B, running from front to rear, and supported in the ordinary way. To ventilate tents of this description I make a circular aperture (or other shape if preferred) in the top about midway of the length of the ridge-pole, as shown in Figs. 1, 2, 3, and 4. This aperture may, if desired, be covered with mosquito-netting, as shown in Figs. 2 and 4, or be left entirely unprovided with such protection, as shown in Fig. 1. Through the ridge-pole in the center of the circular aperture H, I make a hole for the insertion of a socket, I, which receives the axis E of the central plate. This socket is not indispensable, as a simple hole through the ridge-pole will answer the purpose.

To close the aperture H, I provide a circular cover, C, a little larger in diameter than the aperture. This cap-piece I attach to the arms G G, which support it and keep it in an extended position. These arms are of the form most clearly seen in Fig. 14. They are hinged to a central plate, D, by means of their bent ends entering the eyes *a* on said plate, in the manner distinctly shown in Figs. 5, 6, 7, 8, 10, and 14. One pair of the arms is capable of hanging down in the position shown in Fig. 10, while the pair crossing these at right angles is prevented, by reason of the position in which they are hinged to the plate D, from hanging down by the side of the tent, but must either project out horizontally, as shown in Figs. 10 and 14, or be gathered upward, as shown in Figs. 5 and 6. The central plate, D, has an axis, E, which projects downward, and is received into the socket I in the ridge-pole, or into a hole in the ridge-pole itself, if preferred. This axis E has a slit or fork in its lower end, in which is pivoted cross-piece F, so that it can either occupy a position in the line of the axis E, as shown in Fig. 12, or at right angles to it, as shown in Fig. 13. When in the latter position, it serves as a handle by which to turn the cover C, and thus regulate the ventilation of the tent.

It will be perceived that when the axis E is turned to the position shown in Fig. 10 two of the arms will fall into contact with the sides of the tent, and the cover C will occupy the position shown in Fig. 3, the ventilating-aperture being entirely closed. When the axis is turned so that the arms G occupy the position in relation to the ridge-pole B shown in Fig. 14, then the cover is perfectly horizontal, and presents the appearance shown in Fig. 1.

Every possible intermediate position between the two extremes will modify the character of the ventilation of the tent.

It is obvious that by simple changes within the skill of any mechanic of ordinary skill this method of ventilating can be applied to all the usual forms of tents.

Having thus fully described my invention, what I claim, and desire to secure by Letters Patent, is—

The ventilating apparatus for tents, constructed and operating substantially in the manner described.

The above specification of my said invention signed and witnessed at Washington this 30th day of December, A. D. 1862.

JOHN MOAKLEY.

Witnesses:
CHAS. F. STANSBURY,
F. W. HOWARD.